June 11, 1929.  V. A. SMITH ET AL  1,716,742
TRIMMMING MACHINE
Filed June 24, 1924   4 Sheets-Sheet 1

INVENTORS
VERNON A. SMITH
CHARLES BACKMAN
BY
Harry C. Schroeder
ATTORNEY

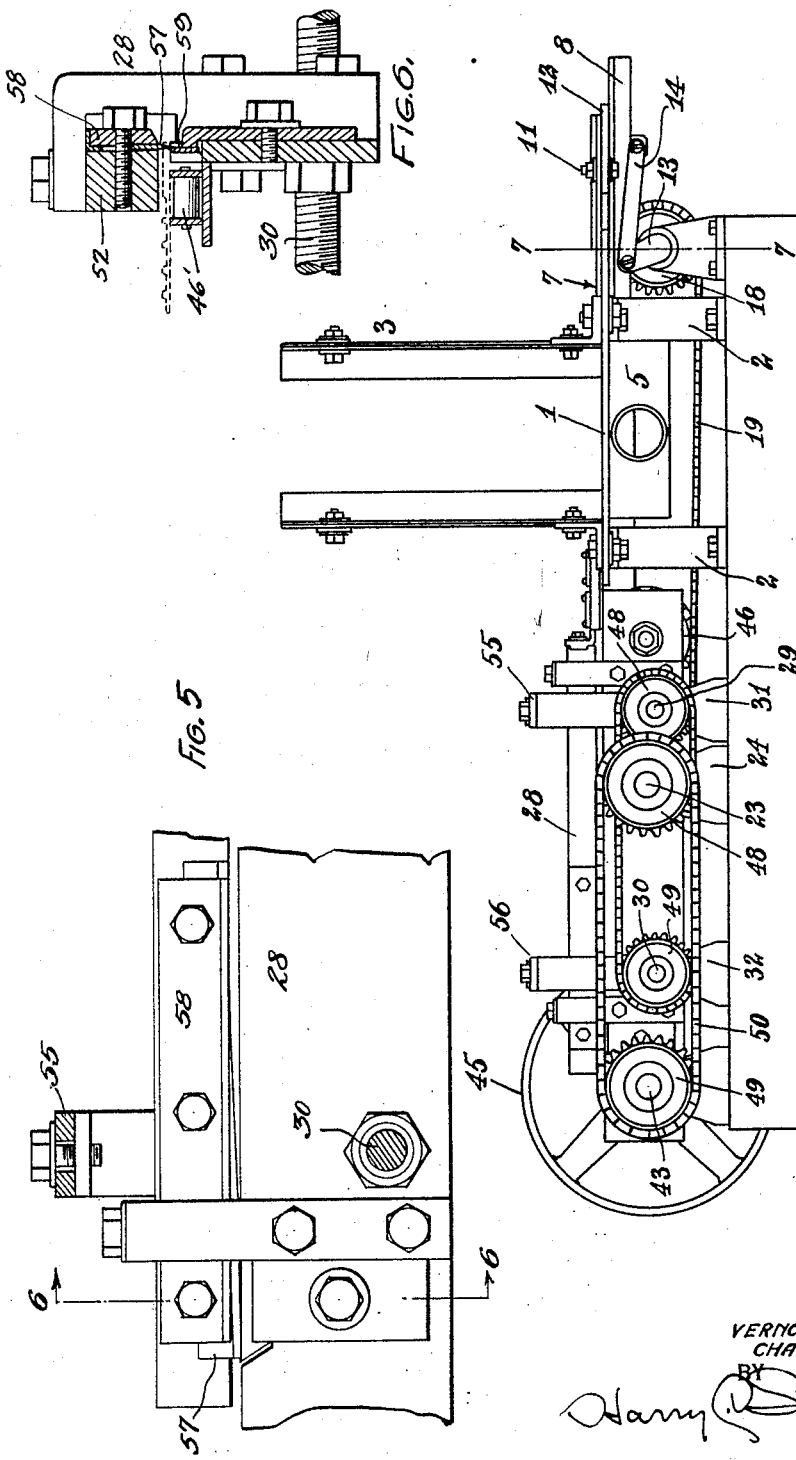

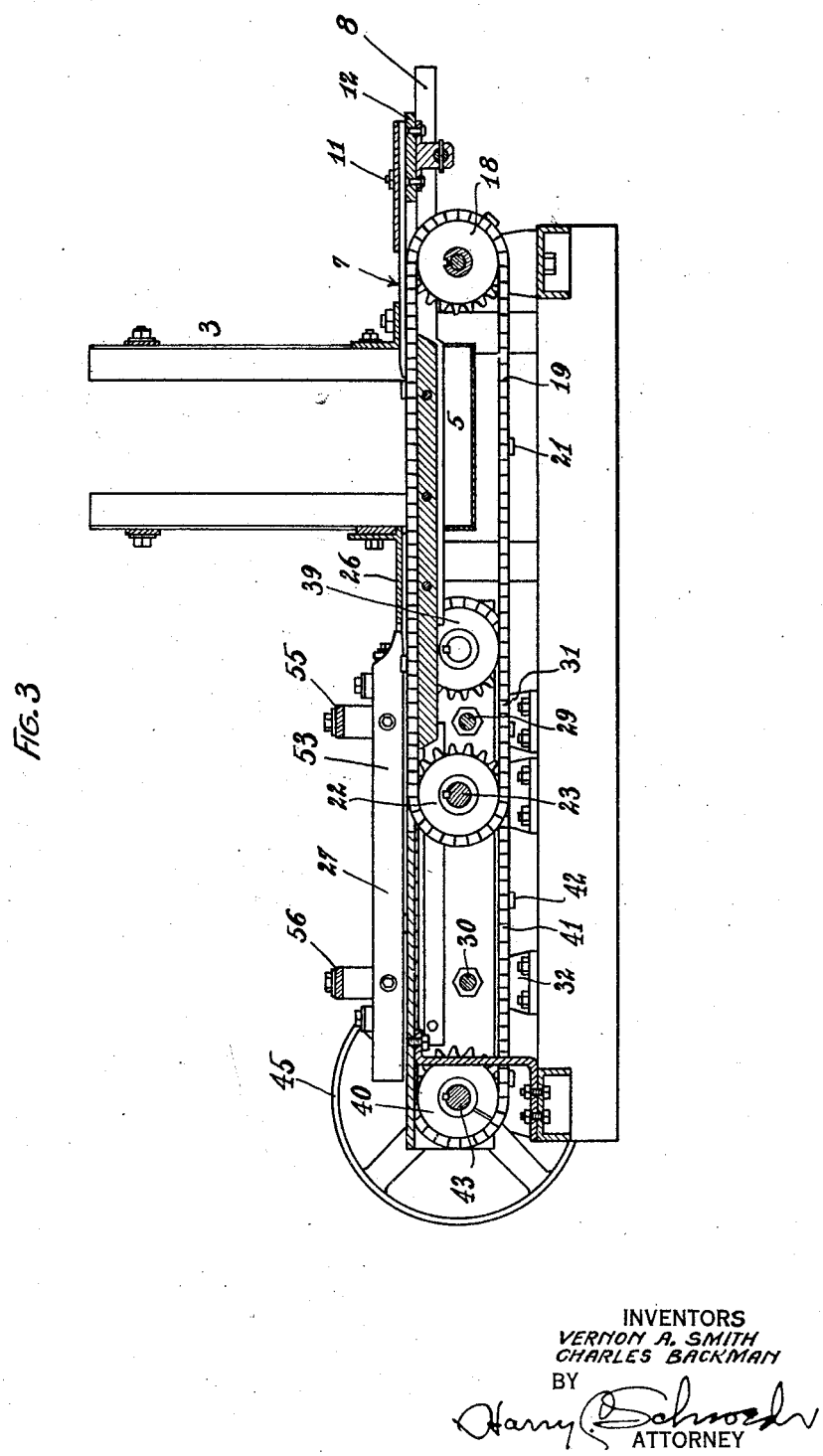

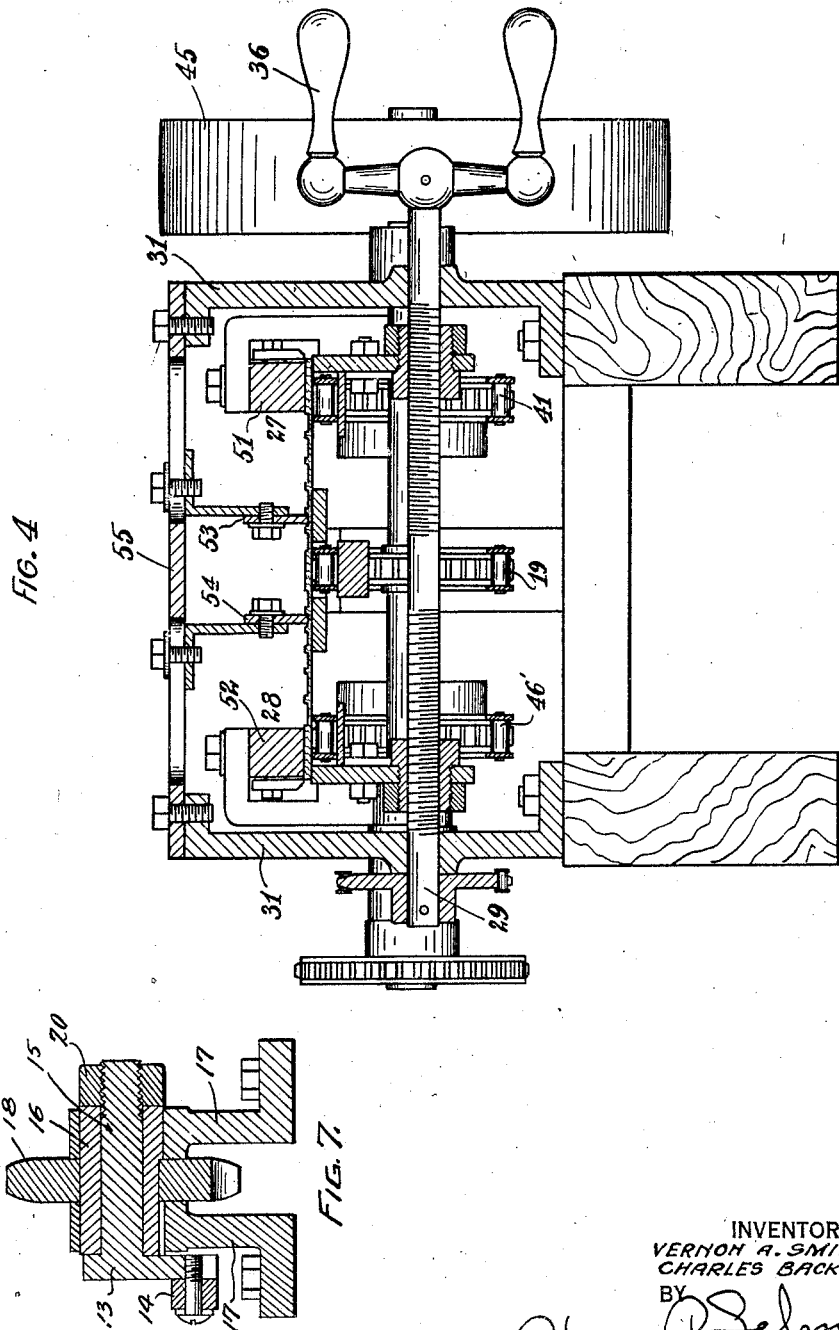

Patented June 11, 1929.

1,716,742

UNITED STATES PATENT OFFICE.

VERNON A. SMITH, OF BERKELEY, AND CHARLES BACKMAN, OF OAKLAND, CALIFORNIA.

TRIMMING MACHINE.

Application filed June 24, 1924. Serial No. 722,166.

Our invention is an improved trimming machine, particularly applicable for trimming the edges on battery separators, and similar products.

In the separator treating process, which is a liquid saponifying process, the separators swell considerably in width, and this increase in width varies slightly in individual separators. After treatment the separators are reduced to the required size in our trimming machine.

The object of our machine is to trim the separators one at a time, the trim being taken at any predetermined point upon adjustment of guides. Another object of our machine is to provide a trimmer which is simple in construction, which will rapidly handle the separators, and which materially reduces the loss incurred in the trimming. A further object is to provide an automatic means of feeding the separators into the cutters.

Our machine comprises a series of combined mechanisms for handling very thin fragile material, such as storage battery separators, feeding them one by one from the bottom of a pile or stack, after flattening the bottom separator by air suction; and engaging it by a pusher plate. The pusher plate accelerates the separator from zero to the speed of a first conveyor, which engages the rear end of the separator from underneath at the center, moves it between side centering guides and passes it onward to guide shoes, which ride in longitudinal grooves in the separator and keep it accurately centered for subsequent operations. Side conveyors now engage the work, near its outside edges, travel at higher speed than the center conveyor thereby drawing the work ahead of the center conveyor so that the pusher lug thereon may dip downward behind the separator without tearing it. The work thus is accurately guided by the shoes at about its longitudinal center, moved by side conveyors, near each edge, to trimming knives operating on the edge. These knives may be stationary, rotating or oscillating slitters.

Other objects and advantages will be more specifically pointed out in the following detailed description.

In the annexed drawing in which our invention is illustrated we have shown the preferred form, but it may also be embodied in other forms, and in this application we desired to cover our invention in whatever form it may be embodied.

Figure 2 is a side elevation of the same.

Figure 3 is a sectional view taken on the line 3—3 of Figure 1.

Figure 4 is a sectional view taken on the line 4—4 of Figure 1.

Figure 5 is an enlarged fragmentary side view of one of the knives.

Figure 6 is a sectional view taken on the line 6—6 of Figure 5.

Figure 7 is a sectional view taken on the line 7—7 of Figure 2.

Figure 1:
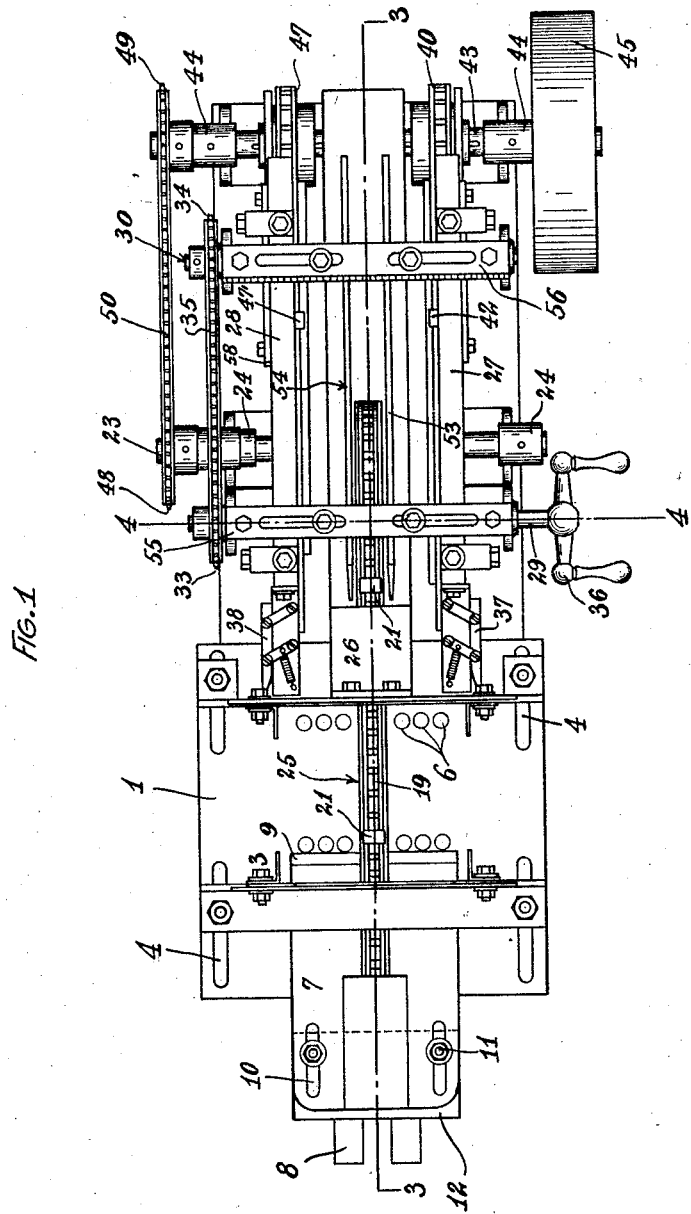
Figure 1 is a plan view of our trimming machine.

Referring more particularly to the drawing, a platform 1 is mounted upon a plurality of posts 2. A hopper 3, in which the separators are adapted to be placed in position upon the platform 1. The hopper 3 is longitudinally adjustable on the platform 1 in slots 4 in said platform. A vacuum chamber 5 is mounted under the platform 1, and is evacuated by any suitable means. A plurality of holes 6 in the platform 1 communicate with the chamber 5 and are positioned within the hopper 3, thus as the separators lie in the hopper the lower one rests over the holes 6 and a vacuum in the chamber 5 presses the separator flat against the platform 1. This is very essential for the separators tend to curl, and consequently will not pass through the knives properly, as will be further described, unless they are started flat.

A pusher plate 7 is reciprocally mounted on a pair of bars 8, which bars are secured to the platform 1. The forward edge of the plate 7 is tapered as at 9 so that the upper separators are pushed away from the lower separator which is to be worked upon, thus breaking the cohesion between the various separators and freeing the lower one so that it may be pushed forwardly. The pusher plate 7 is provided with slots 10 through which bolts 11 extend into a head 12. This head is reciprocated by a crank 13, and a link 14 connecting said crank and the head.

The crank 13 is an integral part of a shaft 15 which extends through a sleeve 16 journaled in suitable bearings 17. A sprocket 18 is mounted on the sleeve 16 between the bearings and a chain 19 encircles said sprocket, the object of which will be further described.

A nut 20 is threaded on to the end of the shaft 15, and bears against the sleeve 16 so that the sleeve and the shaft will rotate together; the object of this construction is to enable the head 12 and plate 7 to be timed with lugs 21 on the chain 19. The chain 19 encircles a sprocket 22, which is mounted upon a shaft 23, which shaft is journaled in suitable bearings 24—24. The operation of the plate 7 is such that it reciprocates from rest to maximum speed, which maximum speed is at the vertical position of the crank 13, and is the same as chain 19. At this instant the chain 19 must pick up the separator by means of the lugs 21 thereon; further the plate must be accurately timed with the lugs so that this object is accomplished.

The pusher plate only extends a short distance into the hopper 3, and merely starts the separator forwardly. The rest of its forward movement is carried out by suitable chains, i. e. 19 and others which will be described.

It is understood that the bottom separator tends to adhere to those above, and must be carefullly broken away from the pack in the hopper 3 in order that no breakage occurs. This we have accomplished by means of our variable speed pusher 7. The chain 19 extends through a slot 25 in the platform 1 to pick up the bottom separator in the hopper 3. The forward edge of the hopper 3 is placed above the platform 1 the thickness of a separator, and a foot 26 secured to said hopper bears against the separators as they are pushed out of the hopper. A pair of longitudinally positioned frames 27 and 28 are mounted upon screws 29 and 30. These screws are journaled in bearings 31—31 and 32—32 respectively; sprockets 33 and 34 are mounted upon the screws 29 and 30 respectively, and a chain 35 encircles said sprockets.

A handle 36 is mounted upon the screw 29 whereby said screw is rotated, and it will be seen that both screws are rotated simultaneously in the same direction. These screws are provided with left and right hand threads extending from the center outwardly, and the frames 27 and 28 being threaded to receive said screws. It will be seen that upon rotation of the handle 36 the frames 27 and 28 will be moved either away or towards each other, depending upon the direction of rotation of the screws 29 and 30.

Yieldable fingers 37 and 38 are mounted upon the rear end of the frames 27 and 28 respectively, and upon the outer edge thereof. The separator in passing through the fingers 37 and 38 will be accurately centered between them. A pair of sprockets 39 and 40 are journaled in the frame 27 and a chain 41 encircles said sprockets. A plurality of lugs 42 are formed upon chain 41, the purpose of which will be further described.

The sprocket 40 is keyed upon a shaft 43, which is journaled in bearings 44—44 and driven from any suitable source of power, such as the pulleys 45. It will be seen that the frame 27 in its transverse movement carries the sprocket 40 with it, which sprocket slides over the shaft 43, but is constantly driven thereby. The frame 28 is provided with sprockets 46 and 47 journaled therein, the sprocket 47 being keyed upon the shaft 43 in the same way that the sprocket 40 is keyed thereupon. These sprockets are encircled by a chain 46', upon which chain lugs 47' are formed.

A sprocket 48 is mounted upon the shaft 23 and a sprocket 49 is mounted on shaft 43 which sprockets are encircled by a chain 50 in which manner the shaft 23 is driven. The shaft 23 is positioned approximately at the center of the frames 27 and 28, consequently the separators are carried by the chain 19 to this point. The lugs 42 and 47' on the chains 41 and 46' engage the separator, and continue its forward movement, after it leaves the chain 19. The sprockets 40 and 47 have one more tooth than the sprocket 22, which gives the chains 41 and 46' a very slightly greater speed, thus the separator in progressing through our trimmer is gradually picked up by the lugs 42 and 47' on chains 41 and 46' and carried away from the lugs 21 on the chain 19. This prevents any splitting of the separator when the lug 21 is moved downwardly in its travel over the sprocket 22.

The frames 27 and 28 are provided with bearing plates 51 and 52 respectively which press upon the outer edge of the separator and hold it in perfect horizontal alignment; guide shoes 53 and 54 adjustably mounted on straps 55 and 56, which straps extend across the bearings 31 and 32. These shoes are adjustable transversely and are adapted to engage the grooves in the separator so that these separators will be accurately guided in their travel through the knives, as will be further described, as shown in Figure 4.

It is understood that the grooves are variously placed in the separators, consequently an adjustment is necessary. These shoes also serve to press the central part of the separator downwardly, and to keep it flat at all times.

As far as described, it will be seen that the separator is first carried along by a single lug bearing against the center thereof which pushes it between yieldable fingers, which bear against the side of the separator, and accurately center it, to engage the guiding shoes 53 and 54. This centering can readily take place about the single pushing lug, whereas two or more actuating lugs would make this practically impossible. Once it is centered and accurately held in this position by the guide shoes 53 and 54, the separator is guided by two chains with lugs thereon, and carried through the knives.

As here illustrated, the trimming knives are stationary, and it will be readily understood that either rotary or oscillating knives may be employed without departing from the spirit of our invention. The knives upon the frames 27 and 28 being identical only one will be described. A knife 57 is held in position by a plate 58 bolted to the bearing 52, and a second knife 59 is mounted below the knife 57 and acts therewith to cut the separator. The knives 57 and 59 are set at a very slight outward angle so that after the separator is cut it will pass freely from the knives without splitting.

This is a mere detail of construction quite important in the successful operation at high speed of our machine.

From Figure 6 it will be seen how the knives engage the outer edge of the separators and sever this edge. The operation of our machine is as follows:

A plurality of separators are stacked one above the other in the hopper 3, and the machine is started by rotating the pulley 45, which rotates shaft 43 driving chains 41 and 46', the shaft 23, chain 19 and crank 13. The plate 7 is thus reciprocated from the link 14 which pushes the bottom separator forwardly as described. One of the lugs 21 now picks up the separator, carries it out of the hopper 3 between the centering fingers 37 and 38, and into the guides 53 and 54. The separator is now held securely in a centered position, and as the chain 19 continues to carry it forwardly, the chains 41 and 46' pick it up and carry it between the knives 57 and 59 where the outer edge is cut off.

Our machine will operate on battery separators which are very wet, almost like a jelly, or the dry thin separators, by suction flattens the bottom one of a stack, by means of the pusher plate 7 slightly raises the stack above the bottom separator and accelerates it to the speed of the pushing lug 21 on the chain 19, engaging the center of the work. This allows the separator to be accurately centered between yieldable fingers 37 and 38 engaging each edge and while so centered the guide shoes 53 and 54 enter grooves in the midportion, forming longitudinal center guides. While so guided the drive is taken from the single center chain 19 to side chains 41 and 46' having pushing lugs 42 and 47', which engage the work near its outer edges and the outer chains moving at higher speed than the center chain draw the work ahead so that the lug 21 will not tear the piece in passing downward at the sprocket 22. The outer drive chains and their pusher lugs co-operate with the bearing plates 51 and 52 to hold the edges while the knives sever the surplus material.

The methods previously employed consisted in stacking a plurality of separators upon a flat surface to align one edge, and cutting the entire surplus from the other edge. This resulted in a great deal of waste due to splitting of the separators, and because it was practically impossible to cut the edge square. It is readily understood that separators are a very accurately machined piece of wood, upon which a micrometer is placed to gauge its thickness, and its width must be just as accurately determined.

In our machine each separator is handled individually; the surplus is cut equally from both sides, or as predetermined by position of guides, and is then carried into a basket container for use.

Having described our invention, we claim:

1. A trimming machine comprising in combination a hopper adapted to contain a stack of pieces of work, a pusher plate to move the bottom piece in a longitudinal direction, a center conveyor to engage the piece, means to accelerate the pusher plate to the speed of the center conveyor, yieldable side guides to center the piece in relation to the center conveyor, guide shoes to engage the piece between its edges and prevent lateral movement thereof, side conveyors to take the piece from the center conveyor and operating at a higher rate of speed and knives to trim the piece.

2. A trimming machine comprising in combination a platform, a hopper on the platform adapted to contain a stack of pieces of work, an air suction operative through the platform underneath the hopper, a pusher plate having a tapered portion and an end to engage the bottom piece in a stack, a center conveyor having a lug to engage a piece from underneath, means to move the pusher plate in the same direction as the center conveyor with accelerated speed from zero to that of the said conveyor and thereby transfer a piece from the pusher plate to the center conveyor at the speed of the latter, side guides adapted to engage the edges of a piece and move it laterally to center in relation to the center conveyor, guide shoes to engage the piece between its side edges and prevent lateral movement thereof, side conveyors operating along a surface of a piece, overlapping the center conveyor and operating at a higher rate of speed and timed to engage and draw a piece ahead of the lug on the center conveyor and knives contiguous to the side conveyors to trim a piece.

3. A trimming machine comprising a platform, a hopper on said platform, a pusher plate adapted to enter said hopper, and start to advance the work therein, means to reciprocate said pusher, a single conveyor extending through said hopper, a pair of second conveyors extending from the first conveyor, and knives positioned adjacent the second conveyor against which the work is carried.

4. A trimming machine comprising a platform, a hopper on said platform, a pusher plate adapted to enter said hopper and advance the work therein, means to reciprocate said pusher, a chain conveyor extending through said hopper, lugs on said chain to engage the work, a pair of chain conveyors; lugs on said chains to engage the work and advance it from the first chain, and knives positioned adjacent said pair of chains to trim the edges of the work.

5. A trimming machine comprising a platform, a hopper on said platform, a pusher plate adapted to enter said hopper and advance the work therein, means to reciprocate said pusher, a chain conveyor extending through said hopper, lugs on said chain to engage the work, a pair of frames, a chain conveyor journaled in each frame, means to drive said conveyor, lugs on each conveyor to engage the work, means to transversely adjust said frames, and knives mounted on the rear end of said frames.

6. A trimming machine comprising a platform, a hopper on said platform, a pusher plate adapted to enter said hopper and advance the work therein, means to reciprocate said pusher, a chain conveyor extending through said hopper, lugs on said chain to engage the work, a pair of frames, a chain conveyor journaled in each frame, means to drive said conveyor, lugs on each conveyor to engage the work, screws threaded through said frames, means to rotate said screws to transversely adjust said frames, and knives mounted on said frames.

7. A trimming machine comprising a platform, a hopper on said platform, a pusher plate adapted to enter said hopper and advance the work therein, means to reciprocate said pusher, a chain conveyor extending through said hopper, lugs on said chain to engage the work, a pair of frames, a chain conveyor journaled in each frame, means to drive said conveyor, lugs on each conveyor to engage the work, means to transversely adjust said frames, yieldable fingers mounted on the forward end of said frames to align the work, guide shoes adapted to engage grooves in the work, means to transversely adjust said shoes, and knives mounted on the rear end of the frames.

8. In a trimming machine a platform upon which pieces of work may be placed, a pusher plate movable thereover to advance a piece, an endless conveyor to engage a piece and move it in the same direction as the pusher plate, means to accelerate the pusher plate from zero speed to that of the conveyor said conveyor and pusher plate being timed to carry on the piece without slackening of its speed.

9. In a separator trimming machine of the character described, a platform allowing a stack of separators to be placed thereon, means for supporting the stack allowing the lowermost separator to be pushed from underneath the stack through a narrow slot, suction means active on the bottom face of the lowermost separator for flattening the same and aligning the same with the slot and a reciprocating pusher arranged to successively push the separators through the slot the pusher presenting a front edge substantially of the thickness of the separator and inclining upwardly from the front edge for slightly lifting the remainder of the stack from the lowermost separator and breaking adhesion between the two bottom separators.

10. In a separator trimming machine of the character described, a platform allowing a stack of separators to be placed thereon, means for supporting the stack allowing the lowermost separator to be pushed from underneath the stack through a slot and a reciprocating pusher arranged to successively push the separators through the slot, the pusher presenting a front edge substantially of the thickness of the separator and inclining upwardly from the front edge for slightly lifting the remainder of the stack from the lowermost separator and breaking adhesion between the two bottom separators.

11. In a separator trimming machine of the character described, means for confining a stack of separators formed with a slot allowing the lowermost separator to be pushed there-through, a reciprocating pusher engaging the separator substantially along the entire rear edge thereof and timed to gradually increase from zero to maximum speed for advancing the separator into the slot and a second pusher timed to correspond to the maximum speed of the first pusher and to assume the load when the first pusher reaches the end of its travel, the second pusher engaging the rear edge of the separator at its center so as to allow the latter to swing sidewise thereon.

12. In a separator trimming machine of the character described, means for confining a stack of separators formed with a slot allowing the lowermost separator to be pushed there-through, a reciprocating pusher engaging the separator substantially along the entire rear edge thereof and timed to gradually increase from zero to maximum speed for advancing the separator into the slot and a second pusher engaging the rear edge of the separator and timed to correspond to the maximum speed of the first pusher and to assume the load when the first pusher reaches the end of its travel and elastic elements engaging the sides of the separator for guiding the same into a desired direction.

13. In a machine for trimming separators, cutting blades arranged in spaced relation for trimming the edges of a separator; a central conveyor for advancing the separator; means for guiding and centering the separator on said conveyor; and side conveyors operating at a higher rate of speed than the central conveyor for taking the separator from the center conveyor and advancing the same toward and into engagement with the blades.

14. In a machine for trimming separators, cutting blades arranged in spaced relation for trimming the edges of a separator; a central conveyor for advancing the separator; means for guiding and centering the separator upon the conveyor; and means engaging the rear edge of the separator in the immediate proximity of the side edges thereof for advancing the same toward the blades with a higher rate of speed than the speed of the central conveyor, said last means overlapping the central conveyor.

15. In a machine for trimming separators, cutting blades arranged in spaced relation for trimming the edges of a separator; a central conveyor for advancing the separator; means for guiding and centering the separator upon the conveyor; means engaging the rear edge of the separator in the immediate proximity of the side edges thereof for advancing the same toward the blades with a higher rate of speed than the speed of the central conveyor, said last means overlapping the central conveyor; and means for simultaneously adjusting the spacing of both blades relatively to a center line.

16. In a machine for trimming separators, cutting blades arranged in spaced relation for trimming the edges of a separator; a central conveyor for advancing the separator; means for guiding and centering the separator upon the conveyor; and side conveyors operating along a surface of the separator, overlapping the center conveyor and operating at a higher rate of speed so as to draw the separator toward the blades ahead of the center conveyor.

In testimony whereof we affix our signatures.

VERNON A. SMITH.
CHAS. BACKMAN.